April 15, 1958     J. T. GOODWIN     2,830,492
PHOTOGRAPHIC MACHINE
Filed March 7, 1955     5 Sheets-Sheet 1

Joseph T. Goodwin
INVENTOR

ATTORNEY

April 15, 1958     J. T. GOODWIN     2,830,492
PHOTOGRAPHIC MACHINE

Filed March 7, 1955     5 Sheets-Sheet 3

Joseph T. Goodwin
INVENTOR

BY

ATTORNEY

April 15, 1958 J. T. GOODWIN 2,830,492
PHOTOGRAPHIC MACHINE
Filed March 7, 1955 5 Sheets-Sheet 4
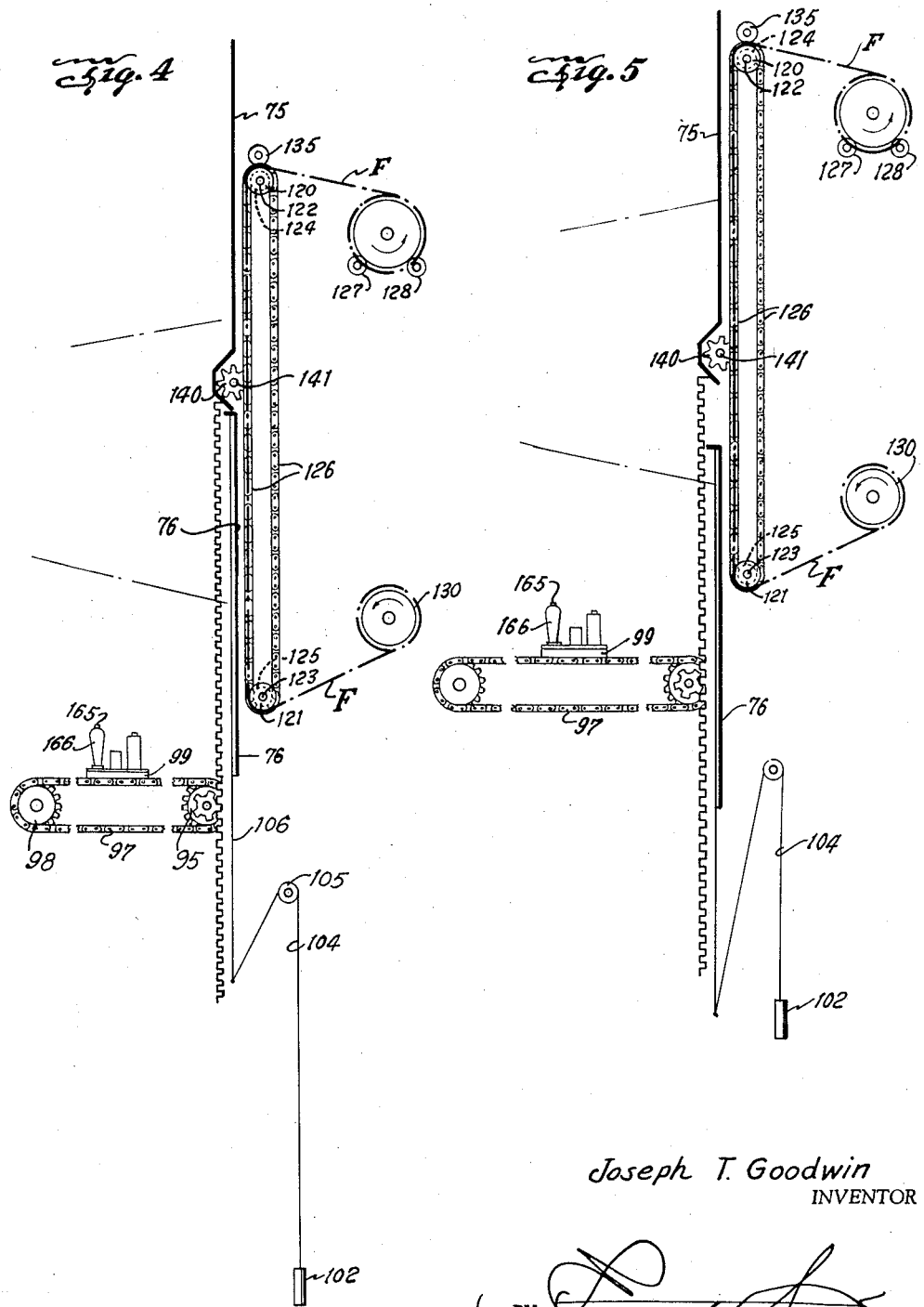
Joseph T. Goodwin
INVENTOR
ATTORNEY

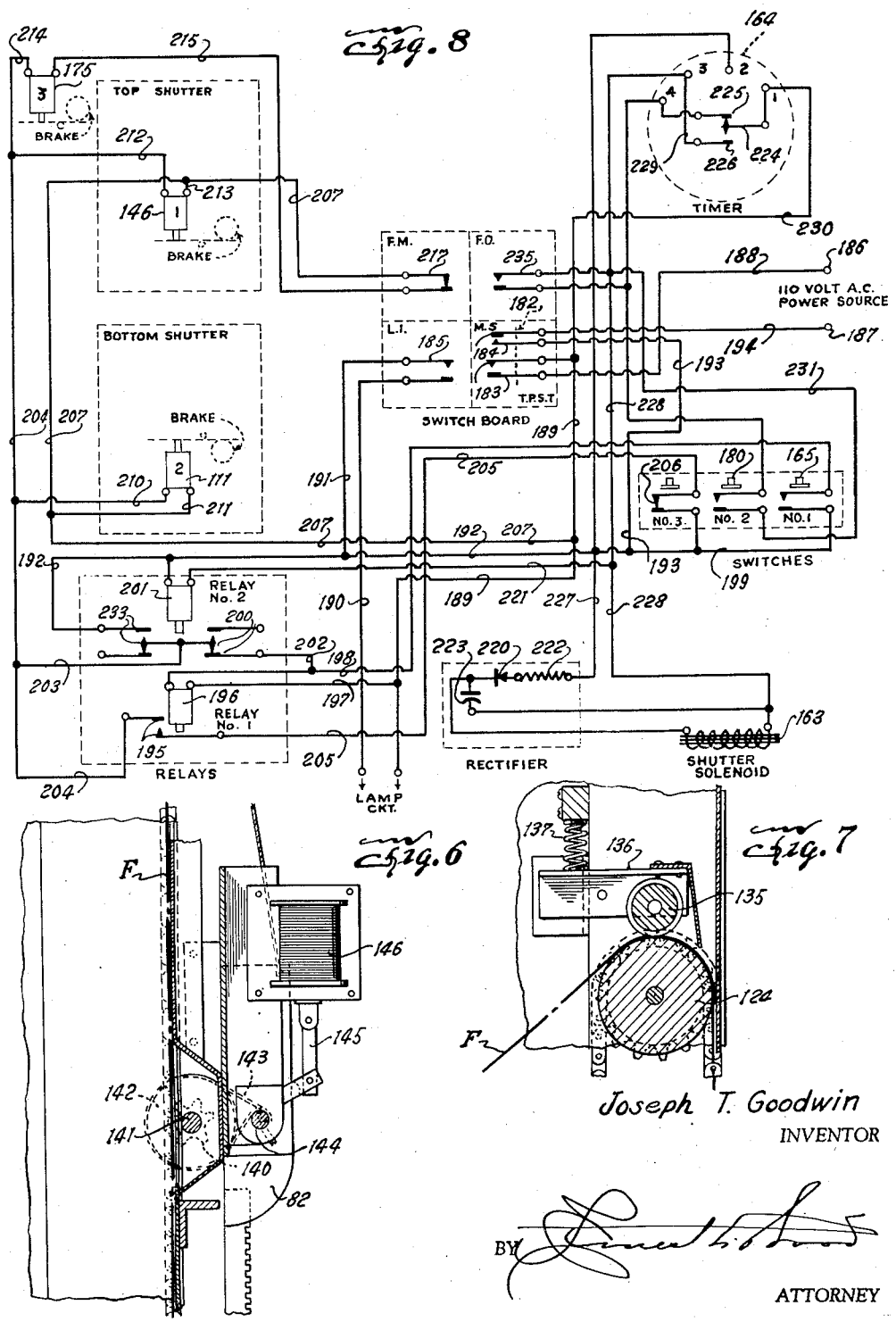

United States Patent Office 2,830,492
Patented Apr. 15, 1958

2,830,492

PHOTOGRAPHIC MACHINE

Joseph T. Goodwin, Dallas, Tex.

Application March 7, 1955, Serial No. 492,449

10 Claims. (Cl. 88—24)

This invention relates to photographic apparatus and more particularly to photographic apparatus for making photographic copies of documents, printed matter and the like.

An object of the invention is to provide a new and improved photographic apparatus for making photographic copies of printed matter and the like.

Another object of the invention is to provide a new and improved photographic apparatus, of the type described, having means for holding a photosensitive paper or film in the focal plane of a camera and a pair of independently positionable masks for exposing only a selected portion of the photosensitive paper or film in the focal plane to light passing through the camera lens.

Still another object of the invention is to provide a new and improved photographic apparatus, of the type described, having means selectively engageable with the means for moving one of the masks and a means for moving the photosensitive paper or film in order to move unexposed portions of the paper or film into the focal plane of the camera.

A further object of the invention is to provide a photographic apparatus, of the type described, having a holder or platform on which matter to be copied may be positioned and an indexing or indicating means adjacent the holder operatively associated with the means for moving the masks so that the masks may be positioned to expose only that portion of the photosensitive paper or film on which the image of a selected portion of the matter is projected.

A still further object of the invention is to provide a photographic apparatus for copying matter which permits copying only selected portions of the matter on photosensitive paper or film, the apparatus permitting only that portion of the photosensitive paper or film to be exposed on which the image of the selected portion is projected, whereby optimum use is made of the photosensitive paper or film.

Still another object of the invention is a photographic apparatus whereby an original, such as the page of a book, may be placed on a support in predetermined position and by operating an indexing means and simple electrical controls associated therewith but without shifting or refocusing the optical system, an image of the original or any indexed off portion thereof is exposed on a length of the film strip in the camera which length is juxtaposed to the prior exposure and just long enough to accommodate the image.

Another object of the invention is to provide a photographic apparatus, of the type described, having easily operable mechanical and electrical controls for the masks, the paper or film moving mechanism, and the camera shutter.

With the foregoing objects in view, the invention has further reference to certain features of accomplishment which will become apparent as the description proceeds, taken in connection with the accompanying drawings, wherein:

Figure 4 is a side schematic view of the masks and the paper or film together with the mechanism for moving the masks and the paper or film, the masks being shown in fully closed position;

Figure 5 is a side schematic view similar to Figure 4 but showing the masks apart exposing a selected portion of the paper or film;

Figure 6 is a fragmentary vertical sectional view of the mechanism for locking the upper mask to the paper or film moving apparatus whereby the paper or film may be moved to place an unexposed portion thereof in position to receive an image of a matter to be copied;

Figure 7 is a fragmentary vertical sectional view of a paper or film tensioning brake; and Figure 8 is a schematic diagram of the electrical circuit controlling the movement of the masks, paper or film and the camera shutter.

Figure 1:
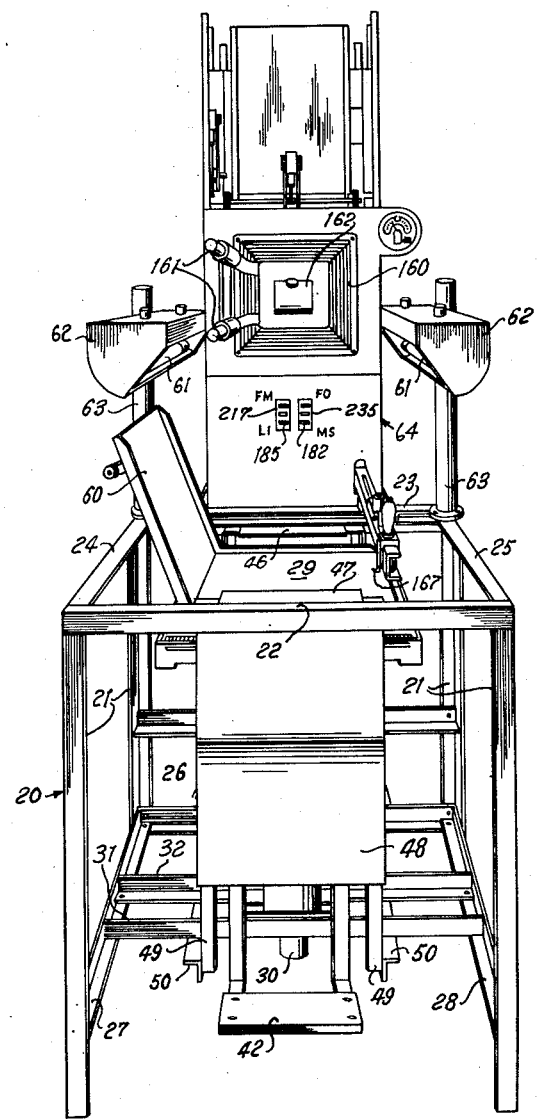
Figure 1 is a front view of the apparatus showing a camera mounted thereon.

Referring now to the drawing, the reference numeral 20 designates, generally, a rectangular frame including four vertical corner posts 21 connected at their upper ends by front and back angle members 22 and 23 and side angle members 24 and 25. The corner posts are connected adjacent their lower ends by a lower back angle member 26 and lower side angle members 27 and 28.

A platform 29 for supporting a book or other matter to be copied is mounted on a plunger 30 slidably extending through a vertical cylindrical member 31 mounted on cross members 32 and 33 which extend between the lower side members 27 and 28 of the frame.

Figure 2:
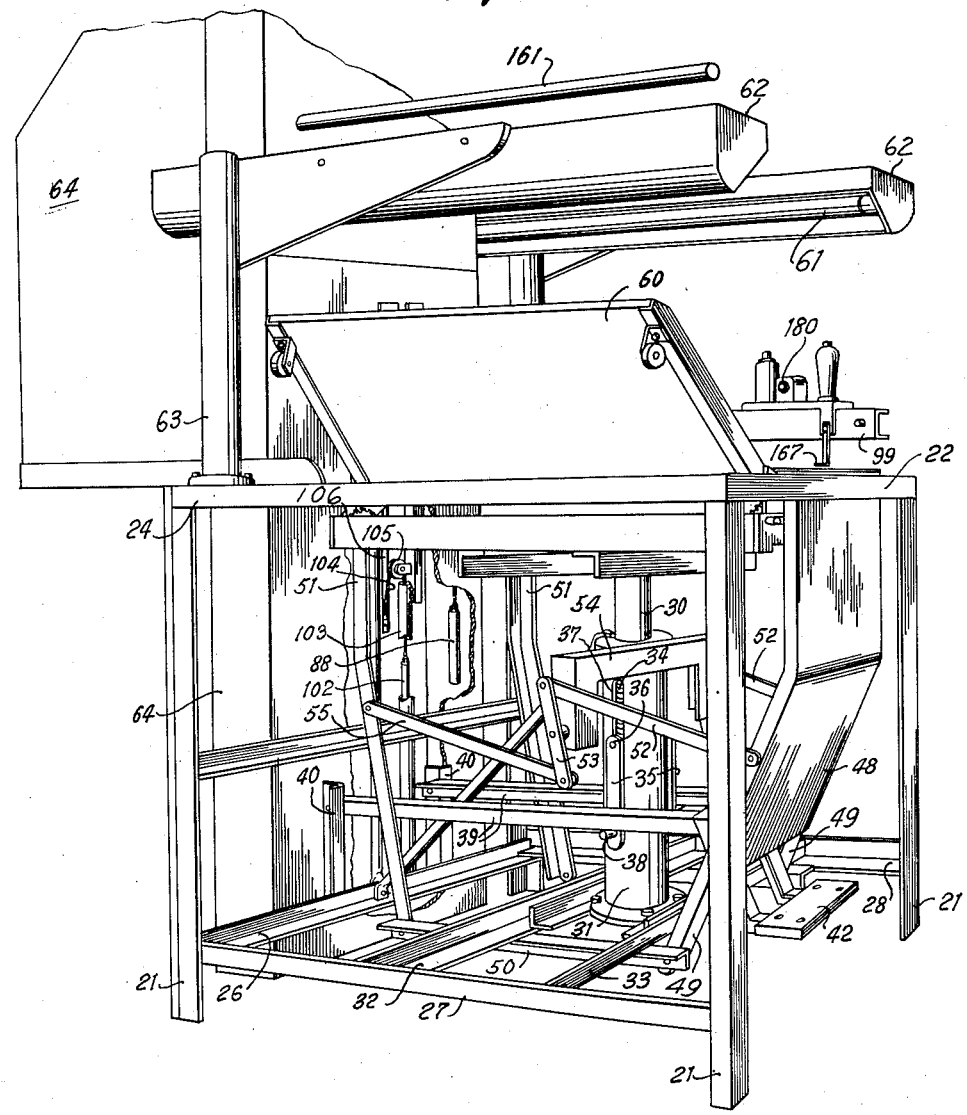
Figure 2 is a perspective view of the apparatus shown in Figure 1 but with the camera removed and certain portions broken away.

The plunger 30, and therefore the platform 29, is biased upwardly by a compression spring 34 (Fig. 2) disposed in the cylindrical member 31. The plunger 30 is movable downwardly against the force of spring 34 by means of a pair of links 35 which are secured at their upper ends to a pin 36 connected to the plunger and whose opposite ends extend outwardly of the cylindrical member through vertical slots 37 in opposite sides thereof. The lower ends of the links 35 are provided with outwardly extending pins 38 on which rest levers 39 whose rear ends are pivotally connected to vertical risers 40 mounted on the lower rear member 26 of the frame. A treadle 42 is mounted on the front ends of the levers 39 so that the operator of the apparatus seated before the frame can move the platform down against the resistance of the spring 34 by pushing downwardly on the treadle with his foot.

The matter to be copied, such as a book, is held firmly on the platform by plates or holders 46 and 47 which extend inwardly over the back and front edges, respectively, of the platform 29 and which are movable inwardly toward each other by means of the knee plate 48 on which the front holder 47 is mounted. The knee plate in turn is mounted on two levers 49 whose lower ends are pivotally secured to two angle members 50 which are rigidly fastened to the cross members 32 and 33. The back plate or holder 46 is mounted on the top ends of levers 51 whose lower ends are pivotally secured to the rear ends of the angle members 50. The front and back holders are connected by a mechanical linkage which includes links 52 whose forward ends are pivotally secured to the knee plate at the sides thereof and intermediate the upper and lower ends thereof. The rear ends of the links 52 are secured to the ends of central links 53 pivotally mounted at their centers to an inverted U-shaped bracket 54 secured to the cylindrical member 31. To the opposite ends of the central links 53 are pivotally secured the forward ends of links 55 whose rear ends are pivotally secured to the levers 51. It will be apparent that the weight of the holders and of the knee plate tends to move them outwardly and that movement of the knee of the operator moving the knee plate 48 inwardly will cause simultaneous movement of the back and front holders toward each other since the mechanical linkage will cause simultaneous equal movement of the two holders.

It will be apparent that when it is desired to photograph a page of a book, the operator depresses the treadle 42 with his foot thereby lowering the platform 29. The book is then placed on the horizontal portion of the platform and opened to the desired page, the inclined plate 60 supporting the left cover of the book together with such pages as are moved to the left as the book is opened. The operator then moves his knee inwardly causing the front and back holders 47 and 46, respectively, to move inwardly over the front (bottom) and back (top) edges of the page to be photographed and the treadle is then released to permit the platform to rise until the edges of the page of the book on the platform engage the holders. The force of the spring 34 then holds the page against the holders preventing any further movement of the page or of the holders. Thus the matter to be copied is held immovable during photographing operations.

The matter to be copied is illuminated by electric lights 61 mounted in reflectors 62 disposed on opposite sides and above the platform. The reflectors are supported on standards 63 mounted on the frame 20.

Figure 3:
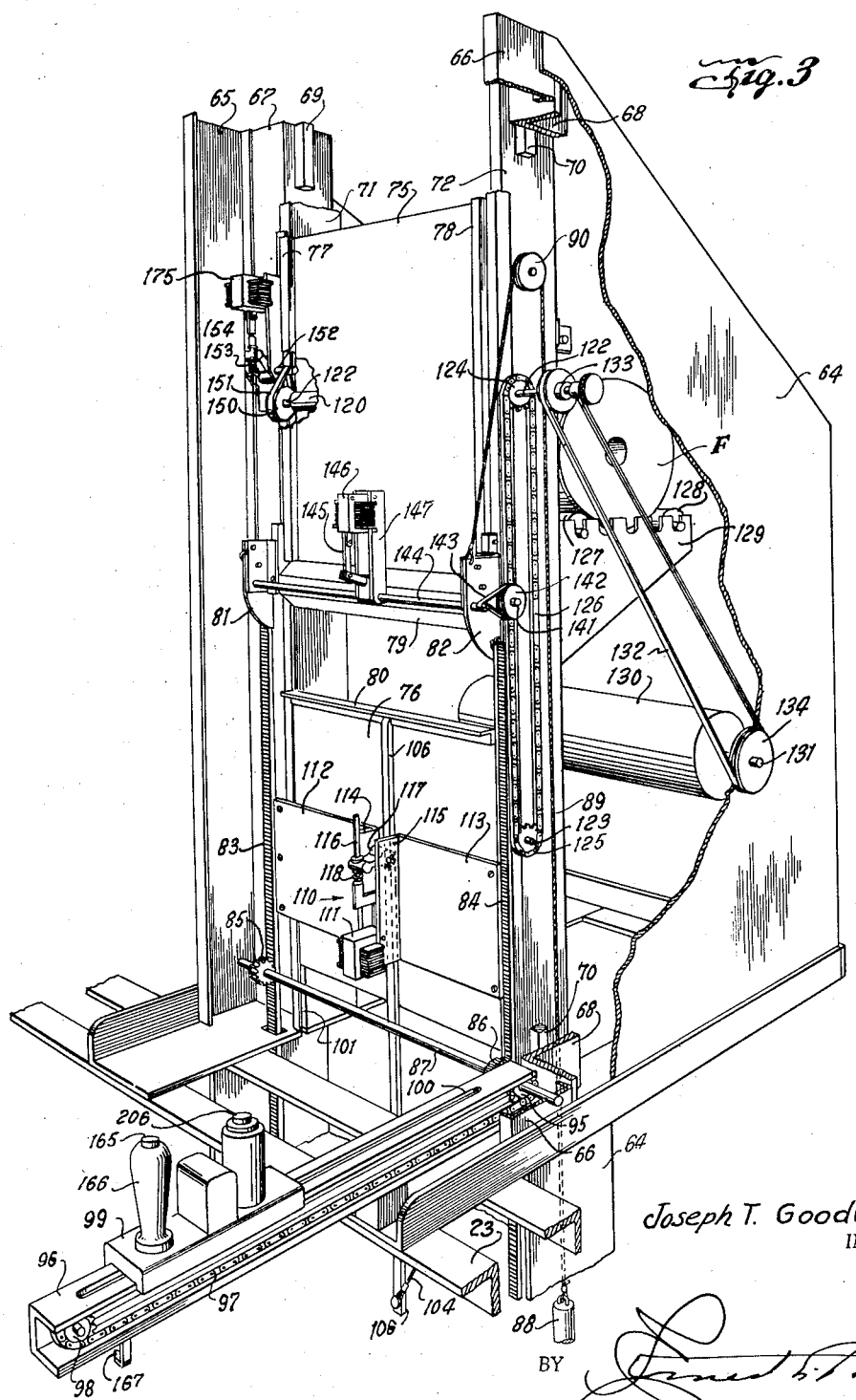
Figure 3 is an enlarged, fragmentary view of the apparatus with some portions removed to disclose the mechanism for moving the masks.

A cabinet or housing 64 is disposed to the rear of the frame 20 and includes a pair of spaced vertical channel members 65 and 66 (Fig. 3) which extend above the frame 20. To the upper portion of the vertical channel members are secured vertical angle members 67 and 68, respectively, and spaced inwardly therefrom by spacers 69 and 70, respectively, are vertical bars 71 and 72 on which are vertically slidable a top mask 75 and a bottom mask 76. The top mask has side flanges 77 and 78 which abut the forward edges of the vertical bars 71 and 72 and a forward horizontal lower enlargement 79, which gives greater rigidity to the top mask, and which is adapted to be engaged by the reinforcing angle member 80 on the upper end of the bottom mask.

Secured to opposite sides of the top mask 75 by means of the mounting plates 81 and 82 are a pair of dependent vertical racks 83 and 84 which mesh with pinion gears 85 and 86, respectively, rigidly mounted on a horizontal shaft 87 journaled in the vertical channel members 65 and 66. Rotation of the shaft 87 thus causes vertical movement of the racks and therefore of the top mask 75. To reduce the force needed to move the top mask, its weight is balanced by means of a counterbalance or weight 88 which is connected thereto by means of a flexible member 89, one of whose ends is connected to the mounting plate 82 and which passes over a pulley 90 rotatably mounted on the vertical bar 72.

The shaft 87 is rotated by means of a sprocket 95 rigidly mounted thereon and disposed in a horizontal channel member 96. A chain 97 extends about the sprocket 95 and a sprocket 98 rotatably mounted in the opposite end of the horizontal channel member. A slide or indexing carriage 99 is slidably mounted on the horizontal channel member 96 and is rigidly connected to the chain 97 by a bolt (not shown) which extends downwardly from the carriage through the slot 100 in the upper flange of the horizontal channel member to the chain.

It will thus be apparent that as the carriage is moved rearwardly toward the masks, the top mask 75 will be moved downwardly and that when the carriage is moved forwardly in the opposite direction, the top mask will be moved upwardly.

The bottom mask is slidably mounted between the vertical bars 71 and 72 and its opposite edges slide in vertical slots 101. The bottom mask is biased upwardly by a weight 102 (Figs. 2 and 4), vertically slidable in a guide cylinder 103, and connected to one end of a flexible member 104. The flexible member 104 passes over a pulley 105 rotatably secured to a fixed member of the cabinet or housing 64 and has its other end secured to a downward extension of a central member or rib 106 (Fig. 3) of the bottom mask.

A locking mechanism 110 operated by a solenoid 111 is employed to lock the bottom mask in any selected position against the force exerted by the weight 102. The locking mechanism is secured in place by the plates 112 and 113 which are rigidly mounted on the vertical bars 71 and 72 and are provided with spaced flanges 114 and 115, respectively, between which the solenoid 111 is mounted. The armature 116 of the solenoid extends through an aperture in the outer end of a brake 117 which is rotatably mounted on and between the flanges 114 and 115. The brake 117 has an eccentric surface so that when the solenoid is energized to move its armature 116 upwards, the brake is rotated to bring its eccentric surface into frictional contact with the rib 106 of the bottom mask and thus lock the bottom mask against movement. The armature 116 is not rigidly connected to the brake 117, the spring 118 disposed about the armature and having opposite ends bearing against an enlargement of the armature and the brake serving to cushion or absorb the shock of movement of the brake against the rib.

The photosensitive paper or film F is moved behind the masks by a pair of horizontal rollers 120 and 121 mounted on shafts 122 and 123, respectively, journaled in the vertical bars 71 and 72. The shafts 122 and 123 are provided at each outer end with sprockets 124 and 125, respectively, and connected by chains 126. Only one chain 126 and only one pair of the sprockets 124 and 125 can be seen in Figures 3–5. Thus the two paper moving rollers 120 and 121 are moved simultaneously, when the chains 126 are moved, so that the paper F is unwound from an upper roll rotatably supported on rollers 127 and 128 rotatably mounted in the cabinet or housing 64, on brackets 129 (Fig. 3) and wound on a lower take-up drum 130 mounted on a shaft 131 journaled in the sides of the cabinet. The drum 130 is rotated simultaneously with the rollers 124 and 125 by means of a belt 132 (Fig. 3) and pulleys 133 and 134 on the shafts 122 and 131, respectively. The drum 130 is of greater diameter than the rollers 124 and 125 so that it maintains the paper under tension, the belt 132 slipping in the pulleys when the tension to which the paper is subjected exceeds a predetermined value.

A tension roller 135 (Figure 7) mounted on a pivoted bracket 136 bears downwardly on the paper passing over the roller 124 to prevent any overrunning of the paper. The weight of the tension roller is counterbalanced to some degree by the spring 137.

The chains 126 are moved to move the paper when the upper mask 75 moves downwardly, by sprockets 140 mounted on shafts 141 journaled in the mounting plates 81 and 82. The sprockets 140 engage the chains 126 and, when the shafts 141 are locked against movement, downward movement of the top mask 75 will cause the chain 126 to move thus causing the paper F to unwind and pass downwardly behind the masks and be rolled up on the take-up drum 130.

The shafts 141 are normally locked against rotation by means of brake drums 142 (only one can be seen in Figure 3) brake bands 143, the ends of the brake bands being connected to the ends of a brake shaft 144 journaled in the mounting plates 81 and 82 so that clockwise rotation (Figure 3) of the brake shaft will loosen the brake bands and permit the sprockets to rotate while counterclockwise rotation of the brake shaft will tighten the brake bands and cause the sprockets to be locked against rotation.

The brake bands are normally kept tight by the weight of the armature 145 of a solenoid 146 mounted on the top mask 75 by means of the channel member 147. When the solenoid is energized, the armature 145 is moved upwardly and the brake shaft 144 is rotated clockwise (as viewed in Fig. 3) to loosen the brake bands 143 and thus allow rotation of the shafts 141 and thus of the sprockets 140.

In order to keep the rollers 124 and 125 from rotating when the top mask is moving upwardly even though the sprockets 140 are free to rotate, a similar braking mechanism is provided on the shaft 122 of the upper roller. It includes a brake drum 150 (Fig. 3) on the shaft 122, a brake band 151 whose ends are secured to a brake shaft 152 having an arm 153 to which is secured the armature 154 of a solenoid 175 mounted on the vertical bar 71. The solenoid 175 when energized tightens the brake band 151 on the brake drum 150 and thus locks the rollers 124 and 125 against rotation.

The cabinet 64 is light proof, its only opening in front being immediately in front of the masks 75 and 76, and this opening is ordinarily closed by a camera 160 (Fig. 1) which is removably mounted on the support bars 161 projecting forwardly from the cabinet. Doors, not shown, are provided in the cabinet 64 to permit loading and removing of the photosensitive paper or film. The camera 160 is provided on the front with a prism 162 or other optical means whereby the image of the horizontally disposed matter on the platform 29 is projected properly on the vertically disposed paper exposed by the masks. The camera may have a shutter which is operated by a solenoid 163, Figure 8, and a timer 164. The solenoids 111, 146 and 175 are simultaneously energized when the button 165 of the handle 166 on the carriage 99 is pushed down.

In use, assuming that material to be copied is disposed on the platform 29 and that one copy has just been made, the carriage 99 is at some intermediate position on the horizontal channel member 96, the solenoids are not energized, the bottom mask 76 abuts the top mask 75, the sprockets 140 are held in locked position so that any movement of the top mask 75 will move the chains 126, and the bottom mask 76 and the rollers 124 and 125 are free to move.

The slide 99 is now moved rearwardly with its index 167 (Fig. 1) traveling along the page until it reaches the top of the page or the top of the portion of the page which is to be copied. The top mask 75, of course, moves downwardly during this rearward movement of the handle 166, and in so doing moves the lower mask down overcoming the upward bias thereon due to weight 102. At the same time, since the sprockets 140 are not free to rotate, the chains 126 are moved causing the rollers 124 and 125 to rotate, thus moving an unexposed portion of paper or film down with the top mask 75. It will be seen that the line formed between the top edge of the exposed portion of the film and the bottom edge of the unexposed portion is maintained in alignment with the abutting bottom and top edges of the upper and lower masks 75 and 76 during this rearward movement of the carriage 99 and index 167. When the index 167 reaches the desired top portion of the page or the top of the portion to be copied therefrom, the button 165 on handle 166 is pressed and the three solenoids 111, 146 and 175 are energized. The energization of solenoid 111 locks the bottom mask 76 in place, the energization of the solenoid 146 frees the sprockets 140 for rotation so that the top mask 75 can now be moved back upwardly without causing the rollers 124 and 125 to rotate, and the solenoid 175 locks the shaft 122 against rotation so that the rollers 124 and 125 are positively locked and thus the paper is held against movement.

While the solenoids are energized, the carriage 99 is moved forwardly (i. e. away from the cabinet 64) until the index 167 is opposite the bottom of the portion of the page which is to be copied. The top mask 75 moves accordingly upwards and since the bottom mask 76 is locked in position, a corresponding portion of the paper is exposed between the top edge of the bottom mask 76 and the lower edge of the top mask 75. The movement of the top mask 75 is so correlated with the movement of the carriage 99 that the image of the desired portion of the page (and that portion only) will be projected on the exposed portion of the paper by the camera 160 when its shutter is opened. It will be understood that while the ratio of movement of the top mask 75 to the movement of the carriage 99 is 1 to 1 in the embodiment disclosed, the ratio can be made of any desired value by proper selection of the gear sizes, so that the copies may be either larger or smaller than the original instead of the same size.

While the three solenoids are still energized, the camera shutter is opened for a predetermined time to cause the image of the original to be projected on the photosensitive paper. When the shutter is closed, the solenoids are de-energized. When the solenoid 111 is de-energized, the bottom mask is freed to move and it rises until it contacts the top mask. The apparatus is now in its original position and this cycle of operation can be repeated to make the next copy.

It will now be apparent that the use of the two masks in conjunction with the indexing mechanism which includes the carriage 99, permits full use of the whole strip of paper since only so much of the paper is exposed as is necessitated by the size of the original to be copied and the successively exposed areas of the film are contiguous with a minimum of space therebetween. Moreover, it will be apparent that a copy need not be made of the whole original if a copy of only a portion thereof, is desired.

It will further be apparent that the apparatus is simple in construction and economical in use requiring little skill or knowledge and permitting very quick copying.

The schematic diagram of Figure 8 illustrates an electrical circuit for controlling the operation of the solenoids 111, 146 and 175 as well as the camera shutter. The normally open switch 180 for initiating operation of the camera shutter by means of the timer 164 and the shutter solenoid 163 may be located on the carriage 99. The third switch 206, which is normally closed, is used to clear the electrical circuit, if before the camera shutter is opened and after the switch 165 has been actuated, it becomes desirable to change the position of the masks or for any other reason not to make the copy.

The control circuit includes a double pole master switch 182 which must be closed before any operation of the apparatus can take place. The master switch through its contacts 183 and 184 enables the lamps 61 to be energized when the lamp switch 185 is closed. When the master switch and the light switch are both closed, current flows to the lamps from one side 186 of the supply circuit to the other side 187 through the conductor 188, the contacts 183 of the master switch, the conductor 189, the lamp circuit, conductor 190, the light switch 185, conductors 191, 192, 193, the contacts 184 and the conductor 194.

The solenoids 111, 146 and 175 are energized when the switch 165 is closed through the relay contact 195 since closing of the switch 165 energizes the relay winding 196 which causes the contacts 195 to close. When the switch 165 is closed, the relay winding 196 is connected across the supply circuit 186, 187 through the conductor 188, contacts 183, conductors 189, 197, 198, switch 165, conductors 199, 193, contacts 184 and conductor 194.

Since the switch 165 may be closed only for a short period of time by the operator who must then perform other operations, it is necessary to provide the normally closed relay contacts 200 which are opened by the relay winding 201, when it is energized. When the relay contacts 200 are closed the relay winding 196 is connected across the supply circuit 186, 187 through the conductor 188, contacts 183, conductors 189, 197, 198, 202, contacts 200, the conductor 203 and 204, the relay contacts 195, the conductor 205, the normally closed circuit clearing switch 206, conductors 199, 193, the contacts 184 of the master switch 182 and the conductor 194.

When the relay contacts 195 are closed, the solenoids 111, 146 and 175 are connected in parallel across the conductors 204 and 207 and thus across the supply circuit 186 and 187. The conductor 204 is connected to the side 187 of the supply circuit through the relay contacts 195, the conductors 205, the normally closed switch 206, the conductors 199 and 193, the contacts 184 of the master switch 182 and the conductor 194. The conductor 207 is connected to the side 186 of the supply circuit through the conductor 189, the contacts 183 of the master switch 182 and the conductor 186.

The solenoid 111 is connected across the conductors 204 and 207 by conductors 210 and 211, the solenoid 175 by the conductors 212 and 213, and the solenoid 146, by the conductors 214 and 215 and the normally closed switch 217 whose function will be described later.

Thus the three solenoids 111, 146 and 175 are energized by the closure of the switch 165 and remain energized even after the switch 165 is allowed to open.

With all three solenoids energized, the shutter solenoid 163 must be energized for a predetermined interval of time to open the shutter of the camera for the predetermined interval of time and, at the expiration of this interval of time, the shutter solenoid 163 and the solenoids 111, 146 and 175 must be de-energized to permit the operational sequence of events to be repeated in order that another copy may be made.

The camera shutter solenoid 163 is energized by a conventional rectifier circuit which includes a selenium rectifier 220, a resistance 222 and a capacitance 223 and is controlled by the switch 180 and the timer 164. The timer 164 is of conventional construction and includes a movable contact 224 which normally contacts the contact 225 but is moved by a mechanism (not shown) to engage the contact 226 when the switch 180 is closed. The movable contact 224 remains in its actuated position engaging the contact 226 for a predetermined interval of time and then moves back to its original position in which it engages the contact 225.

When the switch 180 is closed the shutter solenoid 163 is energized being connected across the supply circuit by the conductor 194, the contacts 184 of the master switch 182, the conductors 193, 227, the rectifier circuit, conductors 228 and 229, the contacts 226 and 224, the conductor 230, the contacts 184 of the master switch 182, and the conductor 188. At the same time, the relay winding 201 is connected to the supply circuit through the conductor 194, the contacts 184, conductors 193, 192, 221, 228, 229, contacts 226 and 224, conductor 230, contacts 183 and the conductor 188. When the relay winding 201 is energized it first closes the contacts 233 and then opens the contact 200 so that there is no interruption in the flow of current to the solenoids 111, 146 and 175 since the conductor 204 is then connected to the side 187 of the supply circuit through the conductor 203, the contacts 233, the conductors 192, 193, the contacts 184 and the conductor 188.

The relay winding 201 and the shutter solenoid 163 remain energized for the predetermined interval of time and when the movable contact 224 of the timer moves back to its original position, the shutter solenoid and the relay winding 201 are de-energized causing the camera shutter to close and the solenoids 111, 146 and 175 to be de-energized bringing the circuit back to its original condition shown in Figure 8.

The switch 206 is a circuit clearing switch which may be opened after the switch 165 has been once closed to restore all relay contacts to their old positions. Switch 206 is not effective once the exposure switch 180 has been pressed since the exposure of the paper has begun. However, up to the time switch 180 is closed, switch 206 may be opened and switch 165 closed; whereupon the position of the upper mask 75 may be adjusted as desired while the bottom mask 76 remains stationary. In case it is desired to start all over again after having gotten ready to make an exposure, the upper mask 75 is brought down against the bottom mask and the switch 165 is released.

The switch 235 is connected across the switch 180 and is employed to open the camera shutter while focal adjustments are being made.

The switch 217 is provided to de-energize the solenoid 146 when it is desired to put in new photosensitized paper or film. The switch 165 must be closed during this operation since the solenoid 175 must be energized to free the film roller for rotation since the sprockets are freed to turn when the solenoid 175 is energized.

It will now be apparent that a new and improved photographic apparatus has been provided which permits copying of originals or portions thereof without wasting any of the photosensitive paper or film on which the copies are made. It will also be apparent that by use of an indexing mechanism together with movable masks only that portion of the photosensitive paper is exposed on which the image of a desired portion of the original or the whole original is projected by a camera. It will also be apparent that the movement of the masks and of the photosensitive paper or film is easily controlled by a mechanism which includes the carriage 99 and suitable solenoids 111, 146 and 175. It will further be seen that an electrical circuit is provided which causes an exposure once commenced to be carried to completion by preventing de-energization of the solenoids 111, 146 and 175 while the camera shutter 163 is energized.

Manifestly, the construction as shown and described is capable of some modification and such modification as may be construed to fall within the scope and meaning of the appended claims is also considered to be within the spirit and intent of the invention.

What is claimed is:

1. In a photographic apparatus for use in making copies of predetermined portions up to all of an original, in combination: means for supporting an original in a horizontal normally stationary position, a vertically movable top mask and a bottom mask; a horizontally movable carriage movable along and parallel to one side of an original held by said supporting means; means connected to said carriage and said top mask for causing said top mask to move vertically downwardly and upwardly in accordance with the rearward and forward movement of the carriage toward and away from the masks; means biasing said bottom mask for upward movement, said top mask engaging the bottom mask to limit upward movement of the bottom mask; means for locking said bottom mask in any desired position; means for holding a strip of sensitized material vertically behind the masks and means selectively connecting said top mask to said strip whereby said strip may be moved downwardly with the top mask so that an unexposed portion of the strip may be exposed when the top mask is again moved upwardly.

2. In a photographic apparatus for use in making copies of an original, in combination; means for supporting an original in a horizontal position, a vertically movable top mask and a vertically movable bottom mask; a horizontally movable carriage movable along and parallel to one side of an original held by said supporting means; means connected to said carriage and said top mask for causing said top mask to move vertically downwardly and upwardly in accordance with the rearward and forward movement of the carriage toward and away from the masks; means biasing said bottom mask for upward movement, said top mask engaging the bottom mask to limit upward movement of the bottom mask; means for locking said bottom mask in any desired position; means for holding a strip of sensitized material vertically behind the masks; means selectively connecting said top mask to said strip whereby it may be moved downwardly with the top mask so that an unexposed portion of the strip may be exposed when the top mask is again moved upwardly, said strip holding and moving means including a pair of vertically spaced rollers, chain and sprocket means connecting said rollers to insure simultaneous movement thereof, said connecting means including a second sprocket means rotatably mounted on said top mask and engaging said chain means; and brake means for selectively preventing rotary movement of said second sprocket means.

3. In a photographic apparatus for use in making copies of an original, in combination: means for supporting an original in a horizontal position, a vertically movable top mask and a vertically movable bottom mask; a horizontally movable carriage movable along and parallel to one side of an original held by said supporting means; means connected to said carriage and said top mask for causing said top mask to move vertically downwardly and upwardly in accordance with the rearward and forward movement of the carriage toward and away from the masks; means biasing said bottom mask for upward movement, said top mask engaging the bottom mask to limit upward movement of the bottom mask; means for locking said bottom mask in any desired position; means for holding a strip of sensitized material vertically behind the masks; means selectively connecting said top mask to said strip whereby it may be moved downwardly with the top mask so that an unexposed portion of the strip may be exposed when the top mask is again moved upwardly, said strip holding and moving means including a pair of vertically spaced rollers, chain and sprocket means connecting said rollers to insure simultaneous movement thereof, said connecting means including a second sprocket means rotatably mounted on said top mask and engaging said chain means; and electrically actuated brake means for selectively preventing rotary movement of said second sprocket means.

4. In a photographic apparatus for use in making copies of an original, in combination: means for supporting an original in a horizontal position, a vertically movable top mask and a vertically movable bottom mask; a horizontally movable carriage movable along and parallel to one side of an original held by said supporting means; means connected to said carriage and said top mask for causing said top mask to move vertically downwardly and upwardly in accordance with the rearward and forward movement of the carriage toward and away from the masks; means biasing said bottom mask for upward movement, said top mask engaging the bottom mask to limit upward movement of the bottom mask; means for locking said bottom mask in any desired position; means for holding a strip of sensitized material vertically behind the masks; means selectively connecting said top mask to said strip whereby it may be moved downwardly with the top mask so that an unexposed portion of the strip may be exposed when the top mask is again moved upwardly, said strip holding and moving means including a pair of vertically spaced rollers, chain and sprocket means connecting said rollers to insure simultaneous movement thereof, said connecting means including a second sprocket means rotatably mounted on said top mask and engaging said chain means; electrically actuated brake means for selectively preventing rotary movement of said second sprocket means, and electrically operable locking means for locking said rollers against rotation.

5. In a photographic apparatus for use in making copies of an original, in combination: means for supporting an original in a horizontal position, a vertically movable top mask and a vertically movable bottom mask; a horizontally movable carriage movable along and parallel to one side of an original held by said supporting means; means connected to said carriage and said top mask for causing said top mask to move vertically downwardly and upwardly in accordance with the rearward and forward movement of the carriage toward and away from the masks; means biasing said bottom mask for upward movement, said top mask engaging the bottom mask to limit upward movement of the bottom mask; means for locking said bottom mask in any desired position; means for holding a strip of sensitized material vertically behind the masks; means selectively connecting said top mask to said strip whereby it may be moved downwardly with the top mask so that an unexposed portion of the strip may be exposed when the top mask is again moved upwardly, said strip holding and moving means including a pair of vertically spaced rollers, chain and sprocket means connecting said rollers to insure simultaneous movement thereof, said connecting means including a second sprocket means rotatably mounted on said top mask and engaging said chain means; electrically actuated brake means for selectively preventing rotary movement of said second sprocket means, said brake means when actuated allowing said rotary movement of said second sprocket means, and electrically operable locking means for locking said rollers against rotation, said electrically actuated brake means and said electrically operable locking means being energized simultaneously.

6. In copying apparatus for activating an image area on a strip of sensitized material by means of radiant energy transmitted and directed from any selected portion up to all of a stationarily positioned original, in combination, a fixedly positioned radiant energy transmitting and directing means for transmitting and directing energy from any selected portion up to all of said original onto said strip of sensitized material in the image plane of said apparatus; means for stationarily supporting and maintaining an original in a fixed relationship with said means for transmitting and directing radiant energy; means for supporting and reciprocably moving a strip of sensitized material in the image plane of said apparatus; two masking means for said sensitized material each separately positionable and reciprocably movable in a direction parallel to the direction of movement of said strip of sensitized material; indicating means associated with said original supporting means and reciprocably selectively movable to indicate the opposite margins of any selected portion up to all of a stationarily positioned original; and coordinating and control means operatively interconnected with said indicating means, said masking means and said sensitized strip moving means and operable, while said original and said radiant energy transmitting and directing means remain in their said fixed positions, to position said masking means so as to provide an opening of correct size and position to permit passage of energy directed from the selected portion up to all of said original to said sensitized strip and to move into position to receive said directed energy an unactivated area of said sensitized strip which lies in juxtaposed relation to the last previously activated portion thereof.

7. In photographic apparatus for use in making copies of selected portions up to all of originals, in combination: table means for supporting an original in a stationary position, a pair of reciprocably movable masks, reciprocably movable pointer means for selecting portions to be copied of an original stationarily positioned on said table means, means connected to said pointer means and one of said masks to shift that mask in accordance with reciprocable movement of said pointer means, means biasing the other mask toward closed relationship with said pointer-controlled mask, means for locking said biased mask in any desired position in which it may be selectively positioned, means for holding a strip of sensitized material behind said masks, and feed means selectively connecting said pointer-controlled mask to said strip whereby said strip may be selectively shifted with said pointer-controlled mask so that an unexposed portion of the strip may be exposed when said pointer-controlled mask is separated from said biased mask.

8. Copying apparatus which without shifting either the position of an original or of a copying camera will serially expose juxtaposed variable portions of a strip of sensitized material corresponding to selected, randomly located, portions up to all of originals stationarily located in an exposure area on which the camera is focused, comprising in combination: table means for stationarily supporting an original in a predetermined exposure area thereon; indexing means reciprocably mounted with respect to said exposure area so as to be movable between two opposite margins thereof; camera means for copying any selected portion up to all of an original located on said exposure area; and means operatively interconnecting said camera means and said indexing means whereby on operation of said indexing means between opposite margins of any selected portion up to all of an original located on said exposure area, a portion of the sensitized strip in said camera which is juxtaposed to the last exposed portion and which coincides with the focal plane image area in the camera means of the selected portion up to all of the original to be copied is positioned for exposure; said camera means comprising, feed means for reciprocably feeding said strip of sensitized material through the focal plane of said camera means, a pair of masking members reciprocably mounted in front of said focal plane the first of which serves to mask the last exposed portion of said sensitized strip and the second of which serves first to mask and then unmask the next to be exposed portion of said sensitized strip, said masking members having closing edges at right angles to the direction of movement of said sensitized film which when closed completely mask said focal plane, mounting means for said masking elements whereby said closing edges may be closed in any desired position intermediate the limits of reciprocation thereof; and means operatively interconnecting said masking elements, feed means and said indexing means whereby after each exposure said masking elements are automatically closed and thereafter upon moving said indexing means to select one margin of the next portion of an original to be copied the closing edge of said first masking element and the boundary line between the exposed and unexposed areas of said sensitized strip are brought into register with one edge of the focal plane image area of said next portion to be copied, and thereafter upon moving said indexing means to the opposite margin of said next portion to be copied said first masking element is held stationary with said strip of sensitized material while the closing edge of said second masking element is moved into register with the opposite edge of the focal plane image area of said next portion to be copied.

9. The copying means called for in claim 8 wherein said feed means for reciprocably feeding said strip of sensitized material comprises a supply roll for holding unexposed sensitized strip material, a take-up roll for holding exposed sensitized strip material, and guide rolls for guiding said sensitized strip material from said supply roll through the focal plane and thence to said take-up roll.

10. Apparatus for making photographic copies of any selected portions up to all of originals without wasting photosensitive medium comprising, in combination: holding means for stationarily supporting said originals in a fixed exposure position; indexing means mounted adjacent said holding means and reciprocably selectively movable to indicate two opposite margins of any selected portion up to all of a stationarily held original to be copied; camera means for photographically copying any selected portion up to all of an original; means supporting said camera in fixed optical alignment with said fixed original for copying selected, randomly located, portions up to all of any original stationarily held on said holding means; means for reciprocably moving and guiding a strip of photosensitive medium through the focal plane area of said camera means; masking means in front of said focal plane comprising a pair of reciprocably movable and independently positionable masking elements, said masking elements being movable in directions parallel to the directions of movement of said photosensitive medium and having meeting edges at right angles to said directions of movement which when closed completely mask said focal plane; brake means for holding one of said mask means against motion; means for reciprocably moving said masking elements separately and in unison and for moving one masking means while the other is held against motion so as to provide an adjustably sized and positioned opening therebetween; and, coordinating and control means operatively interconnecting said mask moving means and said indexing means and operable, while said original and said camera means remain in their said fixed positions, to position said masking elements so as to provide an opening of correct size and position to permit passage of light from the selected portion up to all of said original to said photosensitive medium, said photosensitive medium moving and guiding means being operable to move into position to receive said light from said selected portion up to all of an original an unexposed portion of photosensitive medium which is juxtaposed to the last previously exposed portion thereof.

References Cited in the file of this patent

UNITED STATES PATENTS

| | | |
|---|---|---|
| 1,267,358 | Beidler | May 28, 1918 |
| 1,847,531 | Kesses | Mar. 1, 1932 |
| 2,002,824 | Mayer | May 28, 1935 |
| 2,035,558 | Lloyd | Mar. 31, 1936 |
| 2,247,104 | Takacs | June 24, 1941 |
| 2,415,424 | Gaebel | Feb. 11, 1947 |
| 2,494,599 | Weckbaugh | Jan. 17, 1950 |